United States Patent [19]
De Haan

[11] Patent Number: 5,623,268
[45] Date of Patent: Apr. 22, 1997

[54] DEVICE FOR PROTECTING SSR TRANSPONDERS AGAINST UNINTENDED TRIGGERING ON AN AIRPORT WITH VERY LIMITED MUTING ACTIVITY IN VERTICAL DIRECTION

[75] Inventor: Frans H. De Haan, Lochem, Netherlands

[73] Assignee: British Technology Group Ltd., London, England

[21] Appl. No.: 319,019

[22] Filed: Oct. 6, 1994

[51] Int. Cl.⁶ .......................... G01S 13/87; G01S 13/93
[52] U.S. Cl. ................................. 342/32; 342/37
[58] Field of Search ............................ 342/30, 32, 37, 342/463, 464

[56] References Cited

U.S. PATENT DOCUMENTS

| | | | |
|---|---|---|---|
| 2,713,161 | 7/1955 | Fiske | 342/371 |
| 3,662,392 | 5/1972 | Stapleton et al. | 343/708 |
| 4,179,695 | 12/1979 | Levine et al. | 342/37 |
| 4,213,126 | 7/1980 | Mulder et al. | 342/36 |
| 5,179,384 | 1/1993 | De Haan | 342/37 |
| 5,268,698 | 12/1993 | Smith, Sr. et al. | 342/450 |
| 5,400,031 | 3/1995 | Fitts | 342/36 |

FOREIGN PATENT DOCUMENTS 2073530   10/1981   United Kingdom.

OTHER PUBLICATIONS

"Performance measurements of the transponders aboard aircraft at Gatwick Airport" (London) Eurocontrol Experimental Centre, EEC Task No. AV08, WPDG No. 1/86/RS, EEC Report No. 195.

International Standards, Recommended Practices and Procedures for Air Navigation Services, Aeronautical Telecommunications, Annex 10 to the Convention on Internat'l Civil Aviation, vol. I, Fourth Ed of vol. I,—Apr. 1985, Pt.I&II.
Amendment 69 to vol. I of International Standards, Recommended Practices and Procedures for Air Navigation Services, Aeronautical Telecommunications, Annex 10 to the Convention on Internat'l Civil Aviation, vol. I, Fourth Ed of vol. I,—Apr. 1985, Pt.I&II.
Amendment 69 to vol. II of International Standards, Recommended Practices and Procedures for Air Navigation Services, Aeronautical Telecommunications, Annex 10 to the Convention on Internat'l Civil Aviation, vol. I, Fourth Ed of vol. I,—Apr. 1985, Pt.I&II.
Amendment No. 2 to the Supplement to Annex 10—vol. II (Fourth Edition) Aeronautical Telecommunications.
Amendment No. 3 to the Supplement to Annex 10—vol. II (Fourt Edition) Aeronautical Telecommunications.
International Standards, Recommended Practices and Procedures for Air Navigation Services, Aeronautical Telecommunications, Annex 10 to the Convention on Internat'l Civil Aviation, vol. II, Fourth Ed of vol. II,—Apr. 1985.

*Primary Examiner*—Ian J. Lobo
*Attorney, Agent, or Firm*—Larson and Taylor

[57] ABSTRACT

A device is provided for interrogating airborne SSR transponders at an airport, in which in certain regions which are made non-active, P1 pulses are transmitted followed, with the correct timing, by P2 pulses which have the same or a larger amplitude than the P1 pulses. As a consequence, SSR transponders in these regions are blocked or muted, and this blocking or muting is repeated, whereas in one or a few selected regions, normal interrogating signals are transmitted. Spreading of transmitted pulses to higher levels above ground is countered by keeping the energy of the pulses low and the vertical gain of transmitter antennas small.

9 Claims, 2 Drawing Sheets

DEVICE FOR PROTECTING SSR TRANSPONDERS AGAINST UNINTENDED TRIGGERING ON AN AIRPORT WITH VERY LIMITED MUTING ACTIVITY IN VERTICAL DIRECTION

BACKGROUND OF THE INVENTION

1. Field of the Invention

The invention relates to a device for localizing secondary surveillance radar (SSR) transponders, as specified in Annex 10 to the Convention of Chicago 1944 of ICAO, at an airport.

2. Description of the Prior Art

Devices of the type specified above comprise plurality of transmitters for transmitting an interrogation signal, and a plurality of receivers for receiving the response signal of an SSR transponder. The airport is divided in a plurality of divisional regions, and the transmitters are suitable to transmit interrogating signals to make an SSR transponder present in a predetermined divisional region respond. The device also includes means for controlling said transmitters such that the transmitter or transmitters interrogating different divisional regions transmit successively pulses, which in the different divisional regions are received as interrogating signals P1, P3. These interrogating signals comprise a first pulse P1, possibly after a first predetermined period, a second pulse P2 of smaller reception strength than the first pulse, and at a second predetermined period after the time allotted to the second pulse a third pulse P3. The SSR transponders are muted during a time longer than the sum of said first and second periods after reception of a second pulse of greater or equal strength to the first pulse.

An example of such a device is known from the U.S. Pat. No. 5,179,384 to De Haan.

SUMMARY OF THE INVENTION

According to the invention, an unwanted transponder response is prevented, for instance an unwanted response to disturbing pulses, two disturbing pulses and a pulse from the device itself, or a disturbing pulse and a two pulses of the device itself. Such disturbing pulses can be expected more especially if interrogation signals for SSR transponders also are transmitted from another transmitter, for instance to localize (i.e., determine the location of) airplanes, which are further away from the airport than can be determined with the said device.

Especially with large airports, where such pulses from another transmitter, which pulses often are rather strong, may occur (for instance via reflection) at unpredictable locations and where possibly also pulses of the device itself may also reach another unintended divisional region, it is desirable that SSR transponders are closed or muted within regions, in which, at that moment, no interrogation is wanted. With the known device normally geographically successive regions are successively activated to interrogate a transponder. In most divisional regions no SSR transponder will be present and all transponders of airplanes within the area monitored by the device should not respond, except for SSR transponders of airplanes present in the relatively restricted area, namely that of a single divisional area.

It should be kept in mind that SSR transponders start to react at different amplitude levels. This is also caused by their location within an airplane, possible screening of the aerial or antenna part and so on. Accordingly it is desired, if not necessary, that no SSR transponders can react outside the interrogated region, even if stray and disturbing pulses reach it.

A further problem is that a transponder of an airplane flying over the airport may transmit an unintended response.

According to the invention protection against unintended response of SSR transponders at an airport is obtained by providing means for producing transmission into temporary inactive divisional regions which are spaced from an active divisional region or regions, of, successively, a first pulse P1 having in said temporary inactive divisional regions a first strength, and, after said first predetermined period, a second pulse P2 having in said region or regions a second equal or larger strength. This pulse succession is repeated with intervals of less than the sum of the said predetermined first period and said predetermined second period.

The feature of providing a muting signal that is repeated within the sum of the first and second time periods ensures that the muting signal has reached the SSR transponder before arrival of the pulse P3 at that transponder. The interval preferably is chosen such that it never equals the duration from P1 to P3 of a valid interrogation.

Distinguishing between active and inactive divisional regions provides a further safeguard against unintended reactions or responses of SSR transponders at the airport.

According to a further aspect of the invention this safeguard is enhanced by providing that between the inactive and the active divisional regions one or more neutral divisional regions are located into which no interrogating pulses are transmitted.

With the arrangement discussed above it is attained that transmitted pulses coming from a non-active region are below the triggering level of SSR transponders in the active region.

If from a non-active region first a weak pulse is transmitted and then a stronger one, with a time spacing which equals the said first predetermined period, the SSR transponders present in adjacent regions will be muted up to the region in which the first weak pulse is not detected. Then only the stronger pulse is detected, which, however, in the meantime has weakened considerably.

Measurement of Eurocontrol of large numbers of SSR transponders (as reported in among other "EEC Task No. AV08 WPDG No. 1/86/RS EEC Report No. 195") have shown that SSR transponders are already muted if the amplitudes of P1 and P2 equal each other. It is therefore possible that the amplitude of P2 for a muting signal equals that of P1 though, of course, P2 may also be stronger.

With the invention as exemplified above and, in fact, with many other systems in which interrogating and/or muting pulses are transmitted, it should be provided that no SSR transponders of airplanes flying above or near to the system are muted, especially because of mutual interrogation of airborne SSR transponders as with TCAS.

Operationally, it is very important that at less than 1000 feet above ground level the effect of muting does not occur.

An effective means to limit the level or height above the ground at which transmitters at ground level can trigger or mute SSR transponders consists in providing that the distance from a transmitter is kept small (for instance 150m) and power of the transmitter is kept only sufficient to cover said distance.

Another effective, possibly additional means to attain such a level limitation involves providing that the aerials or antennas of the transmitters have a higher gain (for instance, three times) in the horizontal direction than in the vertical direction. Such an aerial may be a rod aerial with a length of a quarter of the wave length of the transmitted signal and a well defined ground plate, or a dipole at a height of half of said wave length above a well defined ground plate.

By combination of these means it is possible to obtain a good muting in horizontal direction to about 100m from each transmitter and in vertical direction restriction to less than 1000 ft.

The invention covers also a device for interrogating and muting SSR transponders containing one or both of the above means.

BRIEF DESCRIPTION OF THE DRAWINGS

In the following the invention is explained with respect to the drawing, in which.

DESCRIPTION OF THE PREFERRED EMBODIMENTS

Figure 1:
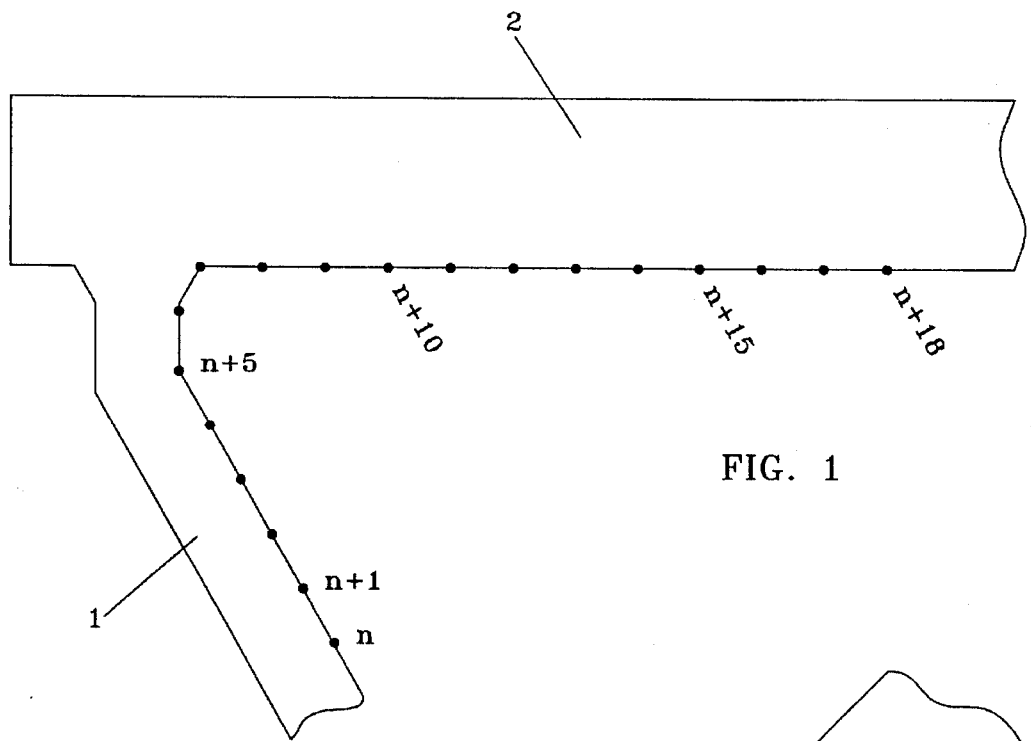
FIG. 1 shows a schematic plan view of part of an airport with transmitters of the inventive device.

In FIG. 1, transmitters n through n+18, inclusive, have been shown with regular spacing along a taxiway 1 and a runway 2.

Other receivers (not shown) are located in such a way that from any location in the area covered by the inventive device a response of a SSR transponder will be received by a sufficient number of receivers to locate the transponder.

Figure 2:
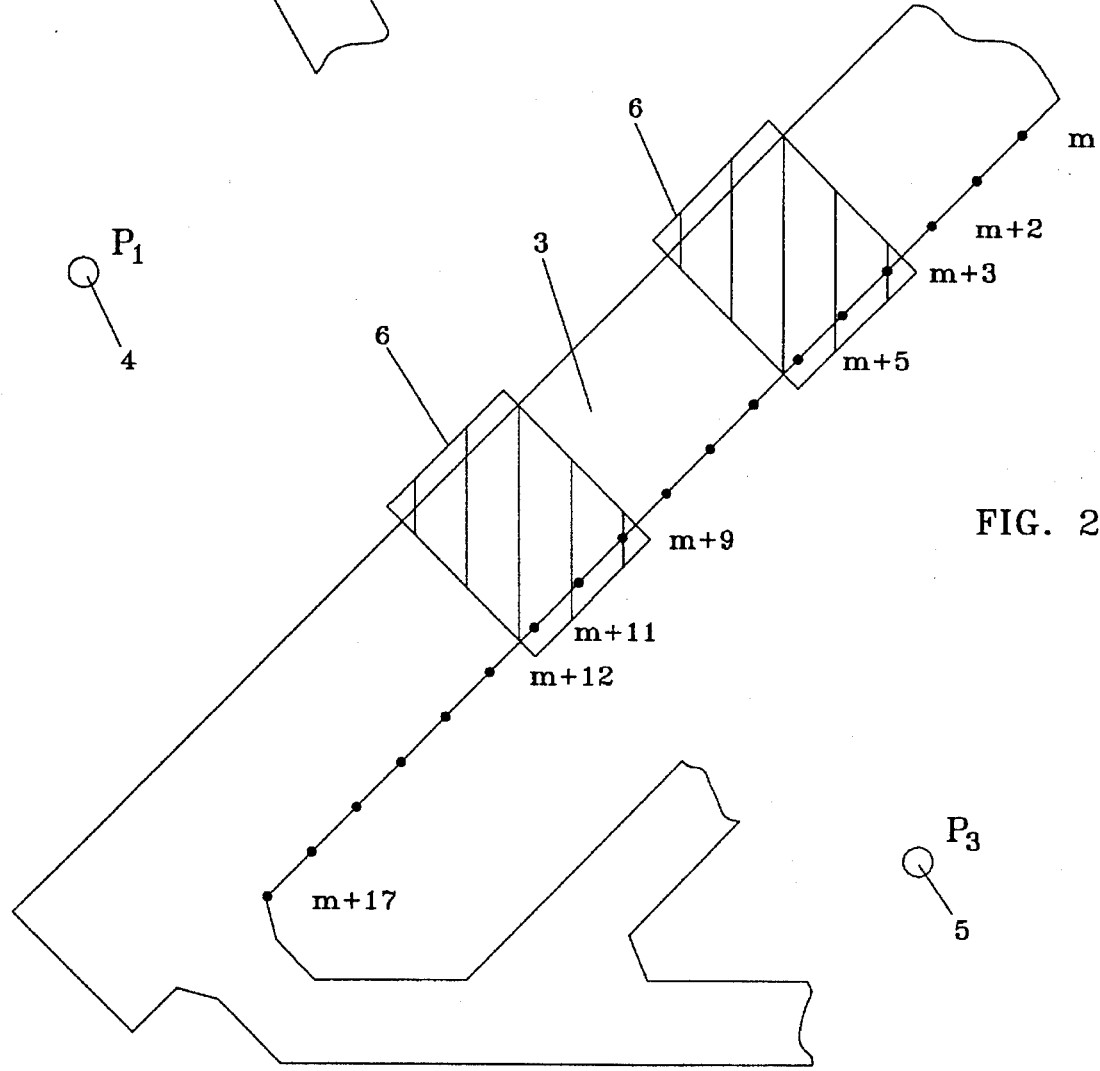
FIG. 2 shows a schematic plan view of part of another airport with the inventive device.
Figure 3:
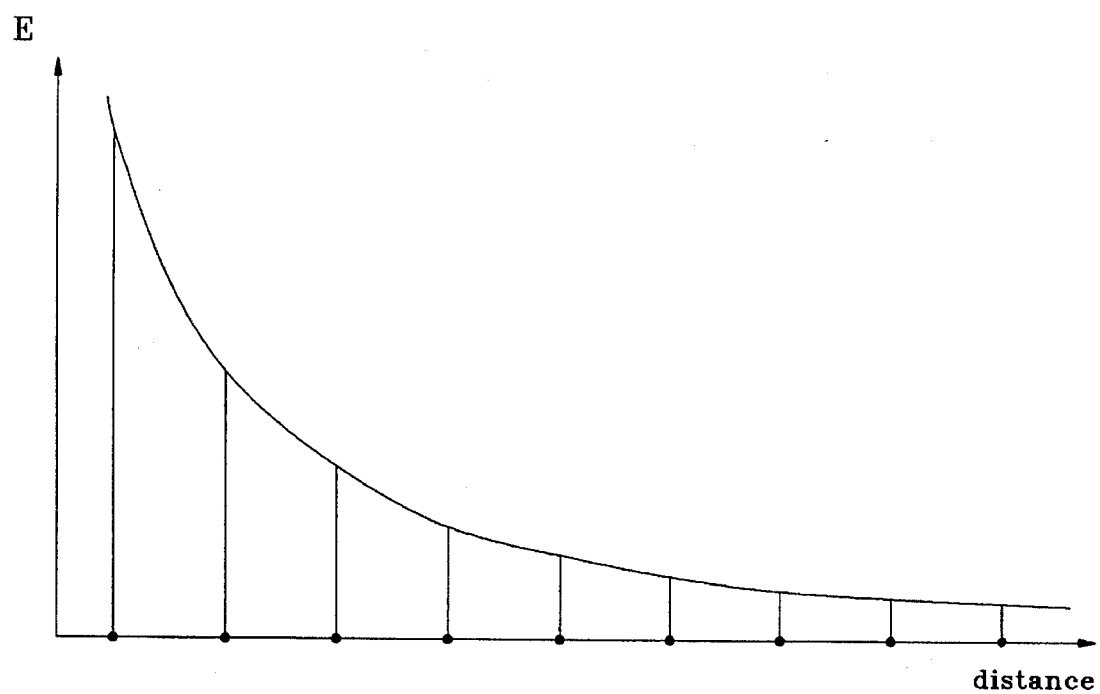
FIG. 3 shows a graph of the strength of a signal transmitted by a transmitter in the direction of a row of transmitters in dependence of the distance.

In the situation depicted in FIG. 2, a taxiway and runway, collectively denoted 3, are interrogated by powerful transmitters 4 and 5 of which one, for instance, transmitter 4, transmits P1 pulses and the other, transmitter 5, transmits P3 pulses. By varying the time lag between successive pulses P1 and P3 the region in which SSR transponders can be triggered is shifted along runway 3. In practice it would be possible to mute SSR transponders in a selected region of the runway 3 by controlling the strength and time lag between pulses transmitted by the transmitters 4 and 5 and the strength of these pulses, such that first pulses from one of the transmitters 4 or 5 are received and thereafter, second pulses are received with a time lag prescribed for P2 pulses, which second pulses are at least equal in strength to the first pulses P1.

Each such pair of pulses which are received in any divisional region will inhibit or mute any SSR transponder in this region.

Such a system would, however, be dangerous in that SSR transponders of airplanes flying above or near to the runway 3 can be muted too, because it is in practice impossible to prevent the pulses from teaching rather high levels above ground. This would imply that the possibility exists that airplanes could remain undetected for the airport control system and other airplanes.

In order to eliminate the change of muting transponders at levels that are operationally significant, a series of transmitters m, m+1 . . . is located along the runway 3. Because of the relatively small distance between successive transmitters m+a, m+a+1 (for instance 150m) only very limited power is required. Further the bundles or beams transmitted by transmitters m, m+1 may be directed near horizontally and mainly in the direction of the runway. These muting signals (pulses P1 and P2) cannot mute any SSR transponder at some substantial height, for instance 1000 feet or higher. On the other hand, one can still obtain safe muting of an SSR transponder of a plane on the runway and in the region where muting is intended.

As shown in FIG. 2 transmitters m are located along the runway 3 with rather small mutual distances such as 150m. Larger distances are possible but it is preferred to keep the distances below 500m. In FIG. 2, where the intended area of interrogation is region 3, in the shadowed regions 6 no muting pulse pairs, i.e., pairs wherein the first one is equal in strength or weaker than the second one, are transmitted.

The localisation that occurs with the invention is such that of all divisional regions only a single or a few are active to have its or their transmitters trigger an SSR transponder, whereas the remaining divisional regions are non-active. To further ensure that SSR transponders present in the non-active regions will not be triggered the invention preferably provides transmission of pulses in such a succession and with such a strength that the SSR transponders are muted in the non-active regions, before a complete interrogation could reach the transponder.

The invention provides increased security against unintended triggering of SSR transponders, which is important, because of common problems at an airport such as air pollution, and pulses or signals with pulse edges for which a transponder may be sensitive.

During the period that region 3 is intended to be interrogated, the stations m to m+2 and m+12 to m+17 are transmitting muting pulse pairs, of which the first one is weaker than or equal to the second one, thus preventing the muting of transponders in region 3, and also preventing the muting of transponders at normal levels of operation, while still muting transponders on the surface of the airport that are not in or close to the area intended to interrogate region 3.

I claim:

1. A system for localizing SSR transponders at an airport, said system comprising a plurality of transmitters for transmitting an interrogation signal, a plurality of receivers for receiving a response signal of an SSR transponder in response to said interrogation signal, the airport being divided in a plurality of divisional regions, and said transmitters transmitting interrogating signals suitable to cause an SSR transponder present in a predetermined divisional region to respond, means for controlling said transmitters such that transmitters interrogating different divisional regions transmit, successively, pulses which, in different divisional regions are received as interrogating signals P1, P3, said interrogating signals comprising a first pulse P1, a second pulse P2 of smaller reception strength than the first pulse and transmitted after a first predetermined time period and a third pulse P3 transmitted a second predetermined period after the time allotted to the second pulse, said SSR transponders being muted during a time period longer than the sum of said first and second periods after reception of a second pulse of a strength at least equal to the first pulse, means for providing transmission into at least one temporary inactive divisional region, spaced from an active divisional region or regions, of, successively, a first pulse P1 having in said at least one temporary inactive divisional region, a first strength and, after said first predetermined period, a second pulse P2 having, in said at least one temporary inactive region, a second strength at least equal to said first strength, said transmission being repeated at intervals of a duration less than the sum of said predetermined first period and said predetermined second period.

2. A system according to claim 1, wherein, between the inactive and the active divisional regions, at least one neutral divisional regions is located in which no interrogating pulses are transmitted.

3. A system according to claim 1 wherein said transmitters each include an antenna having a vertical gain and a horizontal gain which is at least three times greater than said vertical gain.

4. A system as claimed in claim 3 wherein the maximum distance from a transmitter that a SSR transponder can be triggered is less than 500m.

5. A device for determining the locations of SSR transponders on the surface of an airport wherein P1 and P3 interrogating pulses are transmitted by SSR interrogators, said device comprising protective means for protecting transponders from responding to unwanted interrogations by SSR interrogators other than a wanted SSR interrogator, said protective means including means for transmitting into regions, not currently being interrogated by the wanted SSR interrogator, a pulse group comprising a first pulse P1 followed, after a predetermined period, by a second pulse P2 of at least equal amplitude to said pulse P1, said pulse group being repeated at an interval of less than the interval between said interrogation pulses P1 and P3 of the shortest interrogation mode of SSR interrogators used in the region or regions concerned.

6. A system as claimed in claim 5 wherein said transmitters each include an antenna having a vertical gain and a horizontal gain which is at least three times greater than the vertical gain, said transmitters producing a transmission having a strength insufficient to either trigger or mute SSR transponders at ground level at a horizontal distance of more than 500m.

7. A surveying system for an airport provided with interrogating transmitters producing SSR transponder interrogation signals in selected portions of the airport area, wherein said airport is divided into at least ten divisional regions and said regions are provided with muting transmitters for SSR transponders, said surveying system including control means for controlling said muting transmitters so as to cause occurrence of effective muting signals comprising a first pulse P1 and, after a time delay, a second pulse P2, in a plurality of said divisional regions forming an inactive area, without causing the occurrence of said muting signals in other divisional regions outside of said inactive area, said second pulse P2 being at least equal in strength to said first pulse P1.

8. A surveying system according to claim 7, wherein the divisional regions include receiving means for receiving SSR transponder response signals in order to localize the SSR transponder by trilateration.

9. A surveying system according to claim 8, wherein said control means causes a plurality of said divisional regions to be active to mute SSR transponders, one or more divisional regions to be active to carry out trilateration and between one or more divisional regions, the transmitter or transmitters to be inactive.

* * * * *